(12) United States Patent
Jamison et al.

(10) Patent No.: US 9,175,529 B2
(45) Date of Patent: Nov. 3, 2015

(54) METHODS AND COMPOSITIONS FOR TREATING SUBTERRANEAN FORMATIONS WITH INTERLOCKING LOST CIRCULATION MATERIALS

(71) Applicant: Halliburton Energy Services, Inc., Houston, TX (US)

(72) Inventors: Dale E. Jamison, Houston, TX (US); Sharath Savari, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 353 days.

(21) Appl. No.: 13/770,029

(22) Filed: Feb. 19, 2013

(65) Prior Publication Data

US 2014/0231082 A1    Aug. 21, 2014

(51) Int. Cl.
| | |
|---|---|
| E21B 43/04 | (2006.01) |
| E21B 43/267 | (2006.01) |
| E21B 21/00 | (2006.01) |
| E21B 43/26 | (2006.01) |
| C09K 8/03 | (2006.01) |
| C09K 8/50 | (2006.01) |
| C09K 8/62 | (2006.01) |

(52) U.S. Cl.
CPC ............... *E21B 21/003* (2013.01); *C09K 8/03* (2013.01); *C09K 8/50* (2013.01); *C09K 8/62* (2013.01); *E21B 43/04* (2013.01); *E21B 43/26* (2013.01)

(58) Field of Classification Search
CPC .............................. E21B 43/04; E21B 43/025
USPC .................................... 166/278, 280.1, 280.2
See application file for complete search history.

(56) References Cited

U.S. PATENT DOCUMENTS

| | | |
|---|---|---|
| 4,585,064 A | 4/1986 | Graham et al. |
| 4,664,816 A | 5/1987 | Walker |
| 4,670,501 A | 6/1987 | Dymond et al. |

(Continued)

FOREIGN PATENT DOCUMENTS

| | | |
|---|---|---|
| WO | 2011161569 A2 | 12/2011 |
| WO | 2014130279 A1 | 8/2014 |
| WO | 2014130293 A1 | 8/2014 |

OTHER PUBLICATIONS

ME EN 7960, Precision Machine Design—Contact Stresses and Deformations, Topic 7, not dated.

(Continued)

*Primary Examiner* — Kenneth L Thompson
(74) *Attorney, Agent, or Firm* — McDermott Will & Emery LLP; Holly Soehnge (57) ABSTRACT

The present invention provides for methods of treating a fluid loss zone in a wellbore in a subterranean formation including providing interlocking notched particulates having an outer face comprising at least one notch therethrough; wherein the at least one notch has a shape and an inner perimeter value; providing interlocking protruding particulates having an outer perimeter portion that protrudes in an approximate equivalent to the shape and value of the inner perimeter of the at least one notch; introducing the interlocking protruding particulates and the interlocking notched particulates into the wellbore in the subterranean formation; interlocking the interlocking protruding particulates and the interlocking notched particulates through the at least one notch to form an interlocking network of at least one interlocking protruding particulate and at least one interlocking notched particulate; sealing at least a portion of the fluid loss zone.

18 Claims, 2 Drawing Sheets

(56) References Cited

U.S. PATENT DOCUMENTS

| | | | |
|---|---|---|---|
| 4,704,213 | A | 11/1987 | Delhommer et al. |
| 5,249,627 | A | 10/1993 | Harms et al. |
| 5,833,000 | A | 11/1998 | Weaver et al. |
| 5,839,510 | A | 11/1998 | Weaver et al. |
| 5,853,048 | A | 12/1998 | Weaver et al. |
| 5,905,061 | A | 5/1999 | Patel |
| 5,977,031 | A | 11/1999 | Patel |
| 6,287,639 | B1 | 9/2001 | Schmidt et al. |
| 6,311,773 | B1 | 11/2001 | Todd et al. |
| 6,439,309 | B1 | 8/2002 | Matherly et al. |
| 6,528,157 | B1 * | 3/2003 | Hussain et al. ............... 428/325 |
| 6,582,819 | B2 | 6/2003 | McDaniel et al. |
| 6,677,426 | B2 | 1/2004 | Noro et al. |
| 6,828,279 | B2 | 12/2004 | Patel et al. |
| 6,861,392 | B2 | 3/2005 | Shaarpour |
| 7,066,285 | B2 | 6/2006 | Shaarpour |
| 7,108,066 | B2 | 9/2006 | Jamison |
| 7,131,491 | B2 | 11/2006 | Blauch et al. |
| 7,153,575 | B2 | 12/2006 | Anderson et al. |
| 7,350,579 | B2 | 4/2008 | Gatlin et al. |
| 7,392,847 | B2 | 7/2008 | Gatlin et al. |
| 7,455,112 | B2 | 11/2008 | Moorehead et al. |
| 7,482,309 | B2 | 1/2009 | Ravi et al. |
| 7,490,667 | B2 * | 2/2009 | Sinclair et al. ............. 166/280.2 |
| 7,494,544 | B2 | 2/2009 | Go Boncan |
| 7,534,744 | B2 | 5/2009 | Shaarpour |
| 7,534,745 | B2 | 5/2009 | Taylor et al. |
| 7,612,021 | B2 | 11/2009 | Chatterji et al. |
| 7,645,723 | B2 | 1/2010 | Kirsner et al. |
| 7,645,725 | B2 | 1/2010 | Weaver et al. |
| 7,673,686 | B2 | 3/2010 | Nguyen et al. |
| 7,687,571 | B2 | 3/2010 | Vaidya et al. |
| 7,696,131 | B2 | 4/2010 | Oyler et al. |
| 7,717,180 | B2 | 5/2010 | Badalamenti et al. |
| 7,741,247 | B2 | 6/2010 | Wang |
| 7,749,942 | B2 | 7/2010 | Ravi et al. |
| 7,819,192 | B2 | 10/2010 | Weaver et al. |
| 7,825,074 | B2 | 11/2010 | Schmidt et al. |
| 7,836,952 | B2 * | 11/2010 | Fripp ........................ 166/280.1 |
| 7,849,923 | B2 * | 12/2010 | Burukhin et al. .......... 166/280.2 |
| 7,866,393 | B2 | 1/2011 | Badalamenti et al. |
| 7,891,424 | B2 | 2/2011 | Creel et al. |
| 7,900,702 | B2 * | 3/2011 | Reddy et al. .................. 166/276 |
| 7,931,089 | B2 * | 4/2011 | Miller et al. ............... 166/308.3 |
| 7,956,017 | B2 | 6/2011 | Gatlin et al. |
| 7,972,555 | B2 | 7/2011 | Polizzotti et al. |
| 8,003,579 | B2 | 8/2011 | Akarsu et al. |
| 8,043,997 | B2 | 10/2011 | Whitfill et al. |
| 8,076,271 | B2 | 12/2011 | Blauch et al. |
| 8,091,637 | B2 * | 1/2012 | Fripp ............................ 166/278 |
| 8,132,623 | B2 | 3/2012 | Allin et al. |
| 8,136,595 | B2 | 3/2012 | Weaver et al. |
| 8,168,739 | B2 | 5/2012 | Kitamura et al. |
| 8,202,824 | B2 | 6/2012 | Reddy et al. |
| 8,261,833 | B2 | 9/2012 | Nguyen et al. |
| 8,307,916 | B1 | 11/2012 | Wald |
| 8,697,609 | B2 | 4/2014 | Ezell et al. |
| 8,701,774 | B2 * | 4/2014 | Johnson, Sr. ............... 166/308.2 |
| 8,757,259 | B2 * | 6/2014 | Lesko et al. ............... 166/280.1 |
| 8,789,595 | B2 * | 7/2014 | Guerrero et al. ........... 166/280.1 |
| 2007/0181224 | A1 | 8/2007 | Marya et al. |
| 2007/0289781 | A1 | 12/2007 | Rickman et al. |
| 2008/0006405 | A1 | 1/2008 | Rickman et al. |
| 2008/0017374 | A1 | 1/2008 | Surjaatmadja |
| 2008/0108524 | A1 | 5/2008 | Willberg et al. |
| 2008/0149345 | A1 | 6/2008 | Marya et al. |
| 2009/0090559 | A1 | 4/2009 | Polizzotti et al. |
| 2009/0163388 | A1 | 6/2009 | Reddy et al. |
| 2009/0211770 | A1 | 8/2009 | Nutley et al. |
| 2010/0004146 | A1 | 1/2010 | Panga et al. |
| 2010/0071902 | A1 | 3/2010 | Ziegler |
| 2010/0089581 | A1 | 4/2010 | Nguyen et al. |
| 2010/0160187 | A1 | 6/2010 | Nguyen et al. |
| 2010/0179281 | A1 | 7/2010 | Nilsen |
| 2010/0193244 | A1 | 8/2010 | Hoskins |
| 2010/0263870 | A1 | 10/2010 | Willberg et al. |
| 2011/0009839 | A1 | 1/2011 | Lu et al. |
| 2011/0024988 | A1 | 2/2011 | Ryan et al. |
| 2011/0039737 | A1 | 2/2011 | Schmidt et al. |
| 2011/0048720 | A1 | 3/2011 | Diaz et al. |
| 2011/0056752 | A1 | 3/2011 | Young et al. |
| 2011/0098394 | A1 | 4/2011 | Schmeltzer et al. |
| 2012/0067581 | A1 | 3/2012 | Auzerais et al. |
| 2012/0285692 | A1 | 11/2012 | Potapenko et al. |
| 2014/0231086 | A1 | 8/2014 | Jamison et al. |

OTHER PUBLICATIONS

Kumar et al., "Wellbore Strengthening: The Less-Studied Properties of Lost-Circulation Materials," SPE 133484, 2010.

Baroid article entitled Diamond Seal® Absorbent Polymer for Lost Circulation, 2008.

Halliburton Product Data Sheet entitled STOPPIT™ Lost Circulation Material, 2012.

International Search Report and Written Opinion for PCT/US2014/015537 dated Apr. 30, 2014.

International Search Report and Written Opinion for PCT/US2014/015784 dated May 19, 2014.

* cited by examiner

METHODS AND COMPOSITIONS FOR TREATING SUBTERRANEAN FORMATIONS WITH INTERLOCKING LOST CIRCULATION MATERIALS

BACKGROUND

The present invention relates to methods and compositions for treating subterranean formations with interlocking fluid loss control materials.

Hydrocarbon producing wells are typically formed by drilling a wellbore into a subterranean formation. A drilling fluid is circulated through a drill bit within the wellbore as the wellbore is being drilled. The drilling fluid is circulated back to the surface of the wellbore with drilling cuttings for removal from the wellbore. The drilling fluid maintains a specific, balanced hydrostatic pressure within the wellbore, permitting all or most of the drilling fluid to be circulated back to the surface. However, the hydrostatic pressure of the drilling fluid may be compromised if the drill bit encounters certain unfavorable subterranean zones, such as low pressure zones caused by natural fissures, fractures, vugs, or caverns, for example. Similarly, if the drill bit encounters high pressure zones, crossflows or an underground blow-out may occur. The compromised hydrostatic pressure of the drilling fluid causes a reduction of drilling fluid volume returning to the surface, termed "lost circulation." In addition to drilling fluids, other operational treatment fluids, such as fracturing fluid, may be lost to the subterranean formation due to fluid loss. The term "lost circulation" refers to loss of a drilling fluid, while the term "fluid loss" is a more general term that refers to the loss of any type of fluid into the formation. As a result, the service provided by the treatment fluid is often more difficult to achieve or suboptimal.

The consequences of lost circulation or fluid loss can be economically and environmentally devastating, ranging from minor volume loss of treatment fluids, to delayed drilling and production operations, to an underground well blowout. Therefore, the occurrence of fluid loss during hydrocarbon well operations typically requires immediate remedial steps. Remediation often involves introducing a composition into the wellbore to seal unfavorable subterranean zones and prevent leakoff of the treatment fluids within the formation to unfavorable zones. Such compositions are generally referred to as "fluid loss control materials" or "FLCM."

Typical FLCMs are roughly spherical, having a sphericity of about 0.7 to about 1, and formed from cementitious material, flexible polymeric material, or naturally occurring materials (e.g., nut shell pieces or cellulosic materials), for example. In some cases, multiple FLCM types are mixed and used together to treat fluid loss in order to gain the functional benefit of each type.

Traditional FLCMs, however, may only partially seal a fluid loss zone. Multiple factors may affect the success of a fluid loss treatment operation, including, but not limited to, the wellbore size, the wellbore depth, the types of treatment fluids used, the drill bit nozzle size, and the FLCM shape and size. For instance, a particular sized and shaped FLCM may be required to adequately treat a formation, but is of such a size and shape that it interferes with the pumpability of the operational fluid into the wellbore, causing potential damage to drilling equipment and delay. Additionally, traditional FLCMs may form insufficient contact among one another to withstand stresses within the subterranean formation (e.g., the stresses of formation itself, the fluid loss zone, other FLCMs, the stress of flowing treatment fluids, and the like). Traditional FLCMs may also fail to interact with one another to sufficiently prevent treatment fluids from leaking-off into a formation due to the presence of interstitial spaces between aggregated individual FLCMs. This may be particularly so if the FLCMs are of similar shapes and sizes. Moreover, the presence of such interstitial spaces may result in a widening of the interstitial spaces as fluid flows through, thereby compounding the fluid loss problem. Accordingly, an ongoing need exists for methods and compositions of blocking the flow of fluid through fluid loss zones in a subterranean formation.

SUMMARY OF THE INVENTION

The present invention relates to methods and compositions for treating subterranean formations with interlocking fluid loss control materials.

In some embodiments, the present invention provides a method of treating a fluid loss zone in a wellbore in a subterranean formation comprising: providing interlocking notched particulates having an outer face comprising at least one notch therethrough; wherein the at least one notch has a shape and an inner perimeter value; providing interlocking protruding particulates having an outer perimeter portion that protrudes in an approximate equivalent to the shape and value of the inner perimeter of the at least one notch; introducing the interlocking protruding particulates and the interlocking notched particulates into the wellbore in the subterranean formation; interlocking the interlocking protruding particulates and the interlocking notched particulates through the at least one notch to form an interlocking network of at least one interlocking protruding particulate and at least one interlocking notched particulate; sealing at least a portion of the fluid loss zone.

In other embodiments, the present invention provides a method of treating a fluid loss zone in a wellbore in a subterranean formation comprising: providing interlocking notched particulates having an outer face comprising at least one notch therethrough; wherein the at least one notch has a shape and an inner perimeter value; providing interlocking protruding particulates having an outer perimeter portion that protrudes in an approximate equivalent to the shape and value of the inner perimeter of the at least one notch; introducing the interlocking protruding particulates and the interlocking notched particulates into the wellbore in the subterranean formation; interlocking the interlocking protruding particulates and the interlocking notched particulates through the at least one notch to form an interlocking network of at least one interlocking protruding particulate and at least one interlocking notched particulate; wherein the interlocking network exhibits contact stresses between the interlocking notched particulates and the interlocking protruding particulates in the range of about 5 MPa to about 5000 MPa; sealing at least a portion of the fluid loss zone.

In still other embodiments, the present invention provides a method of treating a wellbore in a subterranean formation comprising: providing interlocking notched particulates having an outer face comprising at least one notch therethrough; wherein the at least one notch has a shape and an inner perimeter value; providing interlocking protruding particulates having an outer perimeter portion that protrudes in an approximate equivalent to the shape and value of the inner perimeter of the at least one notch; introducing the interlocking protruding particulates and the interlocking notched particulates into the wellbore in the subterranean formation in a treatment fluid, wherein the treatment fluid is a fluid loss control fluid; fracturing fluid; a frac-packing fluid; or a gravel packing fluid; and interlocking the interlocking protruding particulates and the interlocking notched particulates through the at least one notch to form an interlocking network of at least one interlocking protruding particulates and at least one interlocking notched particulate.

The features and advantages of the present invention will be readily apparent to those skilled in the art upon a reading of the description of the preferred embodiments that follows.

BRIEF DESCRIPTION OF THE FIGURES

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present invention relates to methods and compositions for treating subterranean formations with interlocking fluid loss control materials.

Fluid loss may be a main cause of environmental and economical loss to the oil and gas industry, including a significant contribution to non-productive time (or "NPT") during hydrocarbon well operations. The ability of a FLCM to mitigate the effects of fluid loss often depends heavily on their physical and mechanical properties. FLCMs with greater crush strength, shear strength, compressibility, and resiliency, for example, tend to better impart stress loading ability and, thus, control fluid loss.

The physical properties of FLCMs also dictate their effectiveness at providing sufficient plugging of fluid loss zones. For example, the aspect ratio and sphericity of an FLCM may play an important role in its plugging ability. As used herein, the term "aspect ratio" refers to the ratio of an object's longer dimension to its shorter dimension. As used herein, the term "sphericity" refers to a measure of how spherical, or round, an object is, providing a measure of compactness.

In order to take advantage of potential benefits of a wide range of aspect ratios, the present invention provides for an interlocking mechanism FLCM system, which combines various FLCMs having vast mechanical and physical properties into a system of synergistically operating FLCMs that may form various plugging configurations to control fluid loss and adapt to formation conditions. The interlocking FLCMs of the present invention may provide superior stress resistance compared to a plug of traditional aggregated FLCMs. This phenomenon may be attributable at least to the principle of contact mechanics. As used herein, the term "contact mechanics" refers to the principles surrounding the deformations of solids that contact one another at one or more points.

In general, the principle of contact mechanics dictates that solids in contact with one another are better capable of withstanding outside stresses or loads the more they are in touch with one another, and in particular, the more their touching forms a continuous contact area. For example, according to contact mechanics, two spherical objects contact one another at a point, whereas two cylindrical objects contact one another at a line. The "line" contact is able to withstand significantly more stress than the "point" contact because the "line" contact experiences significantly less internal contact stresses. As used herein, the term "internal contact stress" refers to the stresses arising from the mechanical interaction of solid objects in their areas of contact. Internal contact stresses are particularly relevant because the higher the internal contact stress, the less capable the solid object is at resisting other external stresses. Moreover, the majority of traditional FLCMs are spherical or nearly spherical (e.g., having a sphericity of about 0.7 to about 1) and have an aspect ratio of nearly 1. Traditional FLCMs, therefore, contact one another a point rather than a line. As such, the contact between most traditional FLCMs may be unable to withstand external stresses during hydrocarbon well operations, resulting in dislodgment or displacement and ineffective control of a fluid loss zone.

In some embodiments, the present invention provides a method of treating a fluid loss zone in a wellbore in a subterranean formation comprising providing interlocking notched particulates having an outer face comprising at least one notch therethrough. As used herein, the term "outer face" refers to a surface of the interlocking notched particulate exposed to subterranean formation conditions (e.g., the formation itself, treatment fluids, and the like) and the term "notch" refers to a space, indentation, or hollow in the outer face of the interlocking notched particulate. The notch has a particular shape and an inner perimeter value. As used herein, the term "inner perimeter" refers to the perimeter of the notch within the interlocking notched particulate. The method includes providing interlocking protruding particulates having an outer perimeter portion that protrudes and has the approximate equivalent and inner perimeter value of the notch on the interlocking notched particulates such that the interlocking protruding particulates may interact with the interlocking notched particulates and "fit" into the notch. As used herein, the term "outer perimeter" or "outer perimeter portion" refers to the perimeter of a protruding portion interlocking protruding particulates. Finally, the method includes introducing the interlocking notched particulates and the interlocking protruding particulates into the wellbore in the subterranean formation having a fluid loss zone and allowing them to interlock together and seal at least a portion of the fluid loss zone. As used herein, the term "seal" refers to at least a partial blockage of a fluid loss zone in order to prevent or reduce fluid loss to that zone. Therefore, the interlocking system of the present invention utilizes a two component system: interlocking notched particulates and interlocking protruding particulates, referred to collectively as "interlocking components" or, when interlocked, as an "interlocking network." The interlocking components of the present invention achieve at least two substantial benefits.

First, the interlocking network of the present invention ensures that individual interlocking components have maximum contact with one another, both by the interlocking mechanism and by utilizing interlocking components having a range of sphericity and aspect ratio values. Additionally, the interlocking components of the present invention need not only interact solely through the interlocking mechanism of the present invention or by mere side-by-side aggregation. Rather, the present invention allows the interlocking components, either singly or as an interlocking network, to interact by intertwining through other interlocking networks. As used herein, the term "intertwine" refers to the locking of the interlocking components or an interlocking network of the present invention by a means other than the interlocking mechanism described herein (e.g., the notch and protrusion). This may provide another level of complexity to the interlocking networks of the present invention. Thus, at least a portion of the interlocking network of the present invention may comprise interlocking components that contact one another and form a "line" on at least one surface rather than only "points," so as to better withstand hydrocarbon well operational stresses. In some embodiments, the interlocking network of the present invention exhibits maximum internal contact stresses pursuant to contact mechanics between individual interlocking components in the range from about 5 MPa to about 5000 MPa. In preferred embodiments, the interlocking network comprising the interlocking of at least one interlocking notched particulate and at least one interlocking protruding particulate of the present invention exhibits maximum internal contact stresses pursuant to contact mechanics between the individual interlocking components in the range from about 5 MPa to about 500 MPa. In even more preferred embodiments, the interlocking network comprising the interlocking of at least one interlocking notched particulate and at least one interlocking protruding particulate of the present invention exhibits maximum internal contact stresses pursuant to contact mechanics between the individual interlocking components in the range from about 5 MPa to about 100 MPa.

Second, the interlocking network of the present invention utilizes notches burrowed (or "drilled") within the interlocking notched particulates of the present invention to form a complex set of connections that increases contact, strength, and flexibility of the interlocking network while minimizing potential dislodgment of individual interlocking components. Dislodgement is minimized because of the interlocking notch through which the interlocking protruding particulate connects to the interlocking notched particulate, which increases the shear stress the interlocked interlocking components (or network) can withstand.

The interlocking components, both the interlocking notched particulates and the interlocking protruding particulates, may be of any material known in the art as suitable for use in a hydrocarbon well operation, provided that the interlocking notched particulates can be notched and the interlocking protruding particulates are capable of being sized according to the notch, or can be modified to the size of the notch so as to permit interlocking between the interlocking components. Suitable interlocking component materials include, but are not limited to, ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymer material (such as ethylene vinyl acetate); a polytetrafluoroethylene material; a nut shell; a seed shell piece; a fruit pit piece; clay; silica; any composite particle thereof; and any combination thereof.

The composite particles may formed by the combination of one or more types of interlocking component materials using a consolidating agent. Suitable consolidating agents may include, but are not limited to, non-aqueous tackifying agents; aqueous tackifying agents; emulsified tackifying agents; silyl-modified polyamide compounds; resins; crosslinkable aqueous polymer compositions; polymerizable organic monomer compositions; consolidating agent emulsions; zeta-potential modifying aggregating compositions; silicon-based resins; and binders. Combinations and/or derivatives of these also may be suitable. Nonlimiting examples of suitable non-aqueous tackifying agents may be found in U.S. Pat. Nos. 7,392,847; 7,350,579, 5,853,048; 5,839,510; and 5,833,000, the entire disclosures of which are herein incorporated by reference. Nonlimiting examples of suitable aqueous tackifying agents may be found in U.S. Pat. Nos. 8,076,271; 7,131,491; 5,249,627; and 4,670,501, the entire disclosures of which are herein incorporated by reference. Nonlimiting examples of suitable crosslinkable aqueous polymer compositions may be found in U.S. Patent Application Publication No. 2010/0160187 and U.S. Pat. No. 8,136,595, the entire disclosures of which are herein incorporated by reference. Nonlimiting examples of suitable silyl-modified polyamide compounds may be found in U.S. Pat. No. 6,439,309, the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication No. 2008/0006405 (abandoned) and U.S. Pat. No. 8,261,833, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781 the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in U.S. Patent Application Publication Nos. 2011/0098394 and 2010/0179281 and U.S. Pat. Nos. 8,168,739 and 8,261,833, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results.

The interlocking component materials of the present invention may also be formed of a degradable material. Degradable interlocking components may be desired if the interlocking components is no longer desired after a certain period of time lapses or after a certain condition is reached in the subterranean formation (e.g., a certain temperature), for example. In some embodiments, the interlocking component materials may be oil-degradable, such that they are degraded during production of hydrocarbons in the subterranean formation. The degradable interlocking component materials may be degraded by materials purposely placed in the formation by injection, mixing the degradable interlocking components with delayed reaction degradation agents, or other suitable means to induce degradation.

Suitable degradable interlocking component materials include oil-degradable polymers. Oil-degradable polymers that may be used in accordance with the present invention may be either natural or synthetic polymers. Some particular examples include, but are not limited to, polyacrylics; polyamides; and polyolefins such as polyethylene, polypropylene, polyisobutylene, and polystyrene. In addition to oil-degradable polymers, other degradable interlocking component materials that may be used in conjunction with the present invention include, but are not limited to, degradable polymers; dehydrated salts; and/or mixtures of the two. As for degradable polymers, a polymer is considered to be "degradable" herein if the degradation is due to, in situ, a chemical and/or radical process such as hydrolysis or oxidation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades (e.g., temperature, presence of moisture, oxygen, microorganisms, enzymes, pH, and the like).

Suitable examples of degradable polymers that may be used in accordance with the present invention include polysaccharides such as dextran or cellulose; chitins; chitosans; proteins; aliphatic polyesters; poly(lactides); poly(glycolides); poly(ε-caprolactones); poly(hydroxybutyrates); poly(anhydrides); aliphatic or aromatic polycarbonates; poly(orthoesters); poly(amino acids); poly(ethylene oxides); and polyphosphazenes. Polyanhydrides are another type of particularly suitable degradable polymer useful in the present invention. Polyanhydride hydrolysis proceeds, in situ, via free carboxylic acid chain-ends to yield carboxylic acids as final degradation products. The degradation time can be varied over a broad range by changes in the polymer backbone. Examples of suitable polyanhydrides include poly(adipic anhydride); poly(suberic anhydride); poly(sebacic anhydride); and poly(dodecanedioic anhydride). Other suitable examples include, but are not limited to, poly(maleic anhydride) and poly(benzoic anhydride).

Dehydrated salts may be used in accordance with the present invention as a degradable interlocking component material. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax) and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable interlocking component materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

The interlocking components of the present invention, both the interlocking notched particulates and the interlocking protruding particulates, may be of any size or shape combination compatible with a hydrocarbon well operation. Generally, the interlocking notched particulates are of a smaller size and shape than the interlocking protruding particulates, but need not be.

The interlocking components of the present invention may be substantially spherical or substantially non-spherical, and may also be hollow. Suitable interlocking components for use in the present invention may be, for example, spherical-shaped; cubic-shaped; rod-shaped; cone-shaped; ellipse-shaped; cylinder-shaped; polygon-shaped; pyramid-shaped; torus-shaped; cross-shaped; lattice-shaped; star-shaped; or any other shape. The interlocking components of the present invention may have a size in the range from about 2 to about 400 mesh, U.S. Sieve Series. In other embodiments, the interlocking components of the present invention may have a size in the range from about 8 to about 120 mesh, U.S. Sieve Series. The interlocking components of the present invention may range in sphericity from about 0.3 to about 1. Typically, the interlocking notched particulates of the present invention will have a greater sphericity than the interlocking protruding particulates. Interlocking components that are substantially non-spherical (e.g., having sphericity values at least below 1) may have an aspect ratio in the range of about 1 to about 1.8.

The notch in the interlocking notched particulates may be formed by any means capable of creating a sized and shaped notch within the interlocking notched particulate. For example, the notch may be formed by a drill, a punch, or any other burrowing or drilling tool. The inner perimeter of suitable notches may be of any size, provided that the notch is smaller than the overall outer face of the interlocking notched particulates into which they are drilled and are compatible with the outer perimeter of the interlocking protruding particulates of the present invention. The notch may be any shape compatible with the shape of interlocking protruding particulates to be placed through the notch. Suitable shapes for the notches drilled into the interlocking notched particulates of the present invention may include, but are not limited to round, a v-shape; a square-shape; a rectangular-shape; a circle-shape; an oval-shape; a cross-shape; or a star-shape.

The notches in the interlocking notched particulates of the present invention may be drilled at any depth into outer face of the interlocking notched particulate. In some embodiments, the notch is only superficially deep. In other embodiments, the notch is drilled about halfway through the outer face of the interlocking notched particulate. In still other embodiments, the notch is drilled completely through the outer face of the interlocking notched particulate, as is preferred for hollow interlocking notched particulates. A notch drilled completely through the outer face of an interlocking notched particulate may also provide the advantage of maximizing the interconnectivity and ability to form a complex interlocking network with multiple interlocking components. Additionally, the interlocking notched particulates of the present invention may have multiple notches drilled into their outer face to maximize the potential of interlocking with one or more of the interlocking protruding particulates of the present invention. Moreover, multiple notches drilled through the outer face of a interlocking notched particulate may also be of varying depths to provide additional interlocking network complexity potential. Indeed, the interaction between the interlocking notched particulates and the interlocking protruding particulates of the present invention need not be 1:1. Instead, a single interlocking notched particulate may have multiple interlocked interlocking protruding particulates housed within various notches on its outer face.

Figure 1:
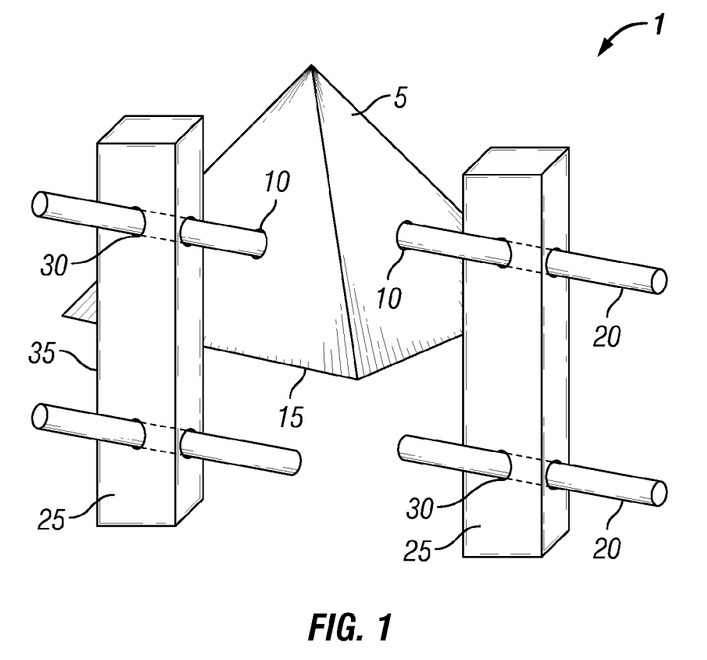
FIG. 1 demonstrates one potential interlocking network that may be formed by the interlocking components of the present invention.

FIG. 1 demonstrates one potential interlocking network 1 that may be formed by the interlocking components of the present invention. Pyramid-shaped interlocking notched particulate 5 has circle-shaped partially-drilled notches 10 through its outer face 15. Rod-shaped interlocking protruding particulates 20 are interlocked through circle-shaped partially-drilled notches 10 of pyramid-shaped interlocking notched particulate 5. Rectangle-shaped interlocking notched particulates 25 have circle-shaped completely-drilled notches 30 through their outer face 35 and are also interlocked with interlocking protruding particulates 20. The pyramid-shaped interlocking notched particulate 5, the circle-shaped partially-drilled notches 10, the rectangle-shaped interlocking notched particulate 25, the circle-shaped completely-drilled notches 30, and interlocking protruding particulates 20 form the interlocking network 1. Both pyramid-shaped interlocking notched particulate 5 and rectangle-shaped interlocking notched particulate 25 could also have additional notches through their outer faces 15 and 35, respectively, in accordance with the present invention in order to build upon interlocking network 1.

Figure 2:
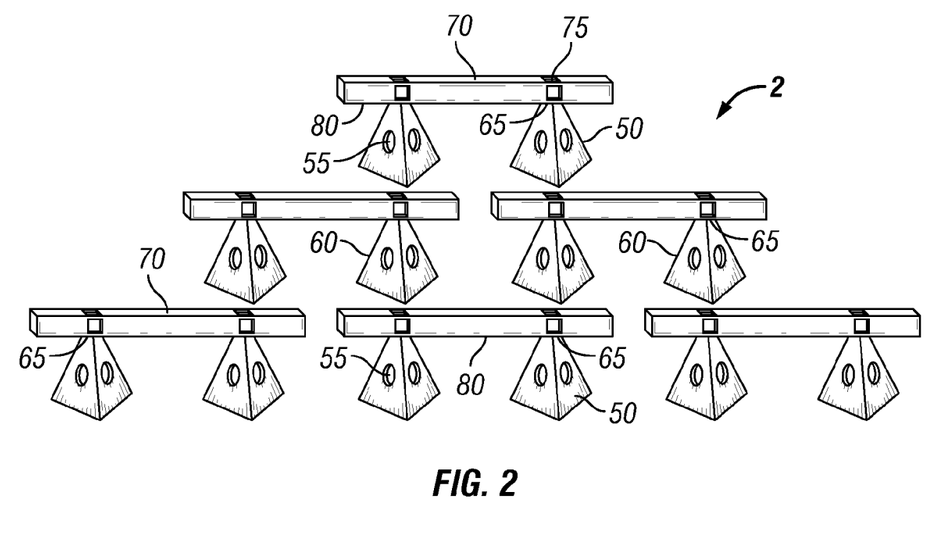
FIG. 2 depicts these interlocking components of the present invention in a potential interlocking network configuration of, where smaller interlocking networks aggregate together.

In some embodiments of the present invention, the interlocking notched particulates may be of a certain size and shape that permits them to serve as both an interlocking notched particulate having at least one notch, as well as a interlocking protruding particulate. These dual functioned interlocking components are a subset of the interlocking notched particulates of the present invention and may be referred to as "interlocking notched-protruding particulates." The term "interlocking notched particulate" encompasses "interlocking notched-protruding particulate" and thus when interlocking notched particulates are referred to herein, a interlocking notched-protruding particulate may be substituted. FIG. 2 depicts these interlocking notched-protruding particulates and another potential interlocking network configuration 2 of the interlocking components of the present invention, where smaller interlocking networks aggregate together (e.g., to seal fluid loss zones). Pyramid-shaped interlocking notched-protruding particulates 50 have circle-shaped partially-drilled notches 55 on their outer face 60 and pointed square-shaped tips 65. Rectangle-shaped interlocking notched particulates 70 have square-shaped partially-drilled notches 75 through their outer face 80 capable of interlocking with the pointed square-shaped tips 65.

Figure 3:
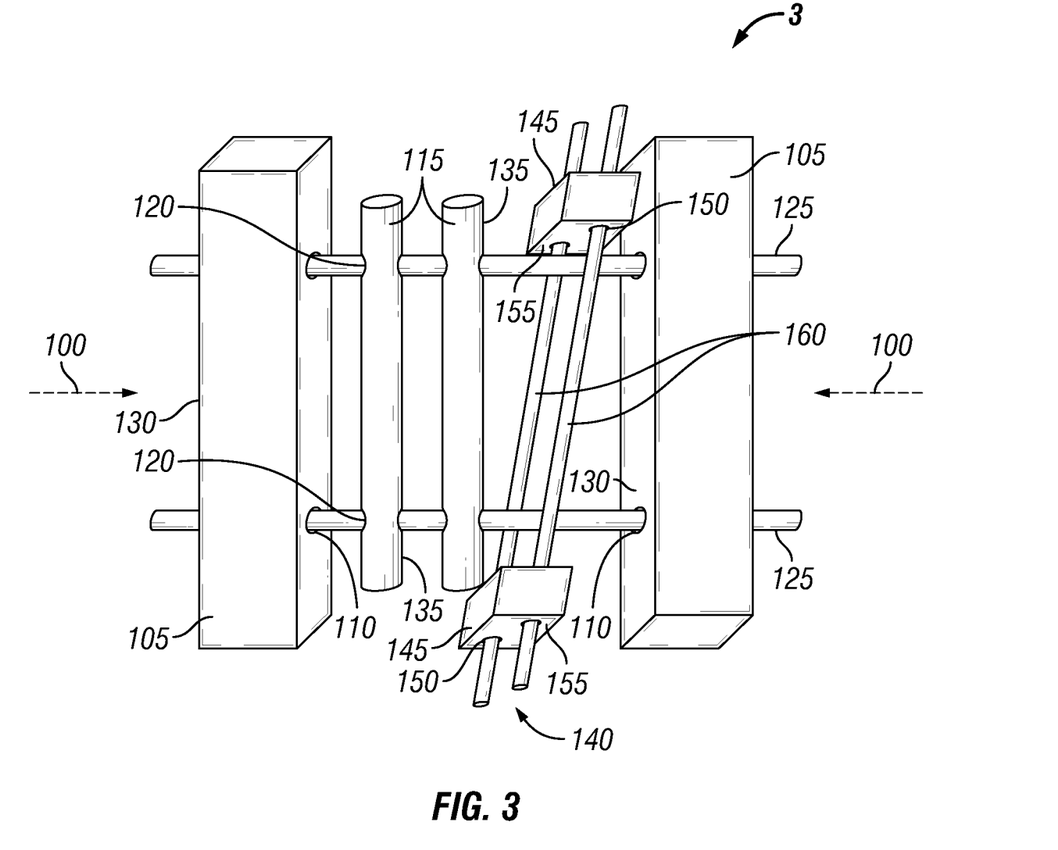
FIG. 3 shows an example of an interlocked network of interlocking components of the present invention that may be resistant to hydrocarbon well operational stresses.

The interlocking network of the present invention formed using multiple interlocking notched particulates (or interlocking notched-protruding particulates) and interlocking protruding particulates may form a web-like interlocking network that may be capable of resisting stresses far better than traditional FLCMs. FIG. 3 shows an example of an interlocked network of interlocking components of the present invention that may be resistant to hydrocarbon well operational stresses. The stress-resistant interlocked network 3 depicted in FIG. 3 may be resistant to lateral stresses 100 acting upon the network. This stress resistance may be due at least in part to the decrease in internal contact stress between the individual interlocking components. Rectangle-shaped interlocking notched particulates 105 have circle-shaped completely-drilled notches 110 on their outer face 130. Rod-shaped interlocking notched particulates 115 have circle-shaped completely-drilled notches 120 on their outer face 135. Interlocking protruding particulate 125 is interlocked through both the circle-shaped completely-drilled notches 110 of rectangle-shaped interlocking notched particulate 105 and the circle-shaped completed-drilled notches 120 of rod-shaped interlocking notched particulate 115. Interlocking network 140 comprises polygon-shaped interlocking notched particulates 145 having circle-shaped completely-drilled notches 150 on their outer face 155. Interlocking protruding particulates 160 are interlocked through the circle-shaped completely-drilled notches 150 of polygon-shaped interlocking notched particulates 145. Interlocking network 140 is intertwined, as previously defined herein, through interlocking protruding particulates 125.

In some embodiments, the interlocking notched particulates and the interlocking protruding particulates are mixed prior to well operations such that at least a portion are interlocked prior to being placed in the subterranean formation. In other embodiments, the interlocking components are not mixed until they are introduced together into the wellbore in the subterranean formation.

The interlocking components of the present invention may additionally be beneficially used in treatment operations other than fluid loss control operations. For example, the superior ability of the interlocking components of the present invention to interact and form an interlocking network which withstands formation stresses and which is capable of intertwining with other interlocking components or interlocking networks may allow replacement or supplement of traditional proppant particulates with the interlocking components of the present invention in fracturing operations. In such instances, replacing or supplementing proppant with the interlocking components may beneficially allow a reduction in materials required to prop a fracture (i.e., comparably far less interlocking components than proppant particulates would be required due to their interlocking capabilities). It may also result in increased permeability within the proppant pack (i.e., the interlocking components may interlock and have larger interstitial spaces than traditional proppants, which tend to be spherical). For at least the same reasons, the interlocking components of the present invention may beneficially replace particulates (e.g., gravel or proppant particulates) in other subterranean formation treatment operational fluids including, but not limited to, fracturing operations, frac-packing operations, and gravel packing operations.

The interlocking components of the present invention may be introduced into a wellbore in a subterranean formation in any treatment fluid that may be used in a hydrocarbon well operation as a fluid loss control fluid; a fracturing fluid; a frac-packing fluid; or a gravel packing fluid. Suitable treatment fluids for use in conjunction with the present invention may include, but are not limited to, oil-based fluids; aqueous-based fluids; aqueous-miscible fluids; water-in-oil emulsions; or oil-in-water emulsions. Suitable oil-based fluids may include alkanes; olefins; aromatic organic compounds; cyclic alkanes; paraffins; diesel fluids; mineral oils; desulfurized hydrogenated kerosenes; and any combination thereof. Suitable aqueous-based fluids may include fresh water; saltwater (e.g., water containing one or more salts dissolved therein); brine (e.g., saturated salt water); seawater; and any combination thereof. Suitable aqueous-miscible fluids may include, but are not limited to, alcohols; (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling" filed on May 23, 1997; U.S. Pat. No. 5,977,031 entitled "Ester Based Invert Emulsion Drilling Fluids and Muds Having Negative Alkalinity" filed on Aug. 8, 1998; U.S. Pat. No. 6,828,279 entitled "Biodegradable Surfactant for Invert Emulsion Drilling Fluid" filed on Aug. 10, 2001; U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004; U.S. Pat. No. 7,645,723 entitled "Method of Drilling Using Invert Emulsion Drilling Fluids" filed on Aug. 15, 2007; and U.S. Pat. No. 7,696,131 entitled "Diesel Oil-Based Invert Emulsion Drilling Fluids and Methods of Drilling Boreholes" filed on Jul. 5, 2007, each of which are incorporated herein in reference in their entirety. It should be noted that for water-in-oil and oil-in-water emulsions, any mixture of the above may be used including the water being and/or comprising an aqueous-miscible fluid.

In some embodiments, the treatment fluid used to transport the interlocking components of the present invention may further comprise an additive including, but not limited to, a salt; a weighting agent; an inert solid; an emulsifier; a dispersion aid; a corrosion inhibitor; an emulsion thinner; an emulsion thickener; a viscosifying agent; a gelling agent; a surfactant; a particulate; a proppant; a gravel particulate; a foaming agent; a gas; a pH control additive; a breaker; a biocide; a crosslinker; a stabilizer; a chelating agent; a scale inhibitor; a gas hydrate inhibitor; a mutual solvent; an oxidizer; a reducer; a friction reducer; a clay stabilizing agent; and any combination thereof.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a fluid loss zone in a wellbore in a subterranean formation comprising:
   providing interlocking notched particulates having an outer face comprising at least one notch therethrough;
      wherein the at least one notch has a shape and an inner perimeter value, and
      wherein the at least one notch is partially-drilled through the outer face of the interlocking notched particulates or is completely-drilled through the outer face of the interlocking notched particulates;
   providing interlocking protruding particulates having an outer perimeter portion that protrudes in an approximate equivalent to the shape and value of the inner perimeter of the at least one notch;
   introducing the interlocking protruding particulates and the interlocking notched particulates into the wellbore in the subterranean formation;
   interlocking the interlocking protruding particulates and the interlocking notched particulates through the at least one notch to form an interlocking network of at least one interlocking protruding particulate and at least one interlocking notched particulate;
   sealing at least a portion of the fluid loss zone.

2. The method of claim 1, wherein the interlocking notched particulates and the interlocking protruding particulates have a sphericity value of about 0.3 to about 1.0.

3. The method of claim 1, wherein the interlocking notched particulates and the interlocking protruding particulates have an aspect ratio of about 1.0 to 1.8.

4. The method of claim 1, wherein the interlocking notched particulates comprise at least one interlocking notched-protruding particulate.

5. The method of claim 1, wherein the outer face of the interlocking notched particulates contains greater than one notch therethrough.

6. The method of claim 1, wherein the step of interlocking the interlocking protruding particulates and the interlocking notched particulates is performed prior to the step of introducing the interlocking protruding particulates and the interlocking notched particulates into the wellbore in the subterranean formation.

7. The method of claim 1, wherein the step of interlocking the interlocking protruding particulates and the interlocking notched particulates is performed after the step of introducing the interlocking protruding particulates and the interlocking notched particulates into the wellbore in the subterranean formation.

8. A method of treating a fluid loss zone in a wellbore in a subterranean formation comprising:
   providing interlocking notched particulates having an outer face comprising at least one notch therethrough;
      wherein the at least one notch has a shape and an inner perimeter value;
   providing interlocking protruding particulates having an outer perimeter portion that protrudes in an approximate equivalent to the shape and value of the inner perimeter of the at least one notch;

introducing the interlocking protruding particulates and the interlocking notched particulates into the wellbore in the subterranean formation;

interlocking the interlocking protruding particulates and the interlocking notched particulates through the at least one notch to form an interlocking network of at least one interlocking protruding particulate and at least one interlocking notched particulate;

wherein the interlocking network exhibits contact stresses between the interlocking notched particulates and the interlocking protruding particulates in the range of about 5 MPa to about 5000 MPa;

sealing at least a portion of the fluid loss zone.

9. The method of claim 8, wherein the interlocking notched particulates and the interlocking protruding particulates have a sphericity value of about 0.3 to about 1.0.

10. The method of claim 8, wherein the interlocking notched particulates and the interlocking protruding particulates have an aspect ratio of about 1.0 to 1.8.

11. The method of claim 8, wherein the interlocking notched particulates comprise at least one interlocking notched-protruding particulate.

12. The method of claim 8, wherein the at least one notch is partially-drilled through the outer face of the interlocking notched particulates.

13. The method of claim 8, where the at least one notch is completely-drilled through the outer face of the interlocking notched particulates.

14. The method of claim 8, wherein the outer face of the interlocking notched particulates contains greater than one notch therethrough.

15. The method of claim 8, wherein the step of interlocking the interlocking protruding particulates and the interlocking notched particulates is performed prior to the step of introducing the interlocking protruding particulates and the interlocking notched particulates into the wellbore in the subterranean formation.

16. The method of claim 8, wherein the step of interlocking the interlocking protruding particulates and the interlocking notched particulates is performed after the step of introducing the interlocking protruding particulates and the interlocking notched particulates into the wellbore in the subterranean formation.

17. A method of treating a wellbore in a subterranean formation comprising:

providing interlocking notched particulates having an outer face comprising at least one notch therethrough;
   wherein the at least one notch has a shape and an inner perimeter value, and
   wherein the at least one notch is partially-drilled through the outer face of the interlocking notched particulates or is completely-drilled through the outer face of the interlocking notched particulates;

providing interlocking protruding particulates having an outer perimeter portion that protrudes in an approximate equivalent to the shape and value of the inner perimeter of the at least one notch;

introducing the interlocking protruding particulates and the interlocking notched particulates into the wellbore in the subterranean formation in a treatment fluid,
   wherein the treatment fluid is a fluid loss control fluid; fracturing fluid; a frac-packing fluid; or a gravel packing fluid; and interlocking the interlocking protruding particulates and the interlocking notched particulates through the at least one notch to form an interlocking network of at least one interlocking protruding particulates and at least one interlocking notched particulate.

18. The method of claim 17, wherein the treatment fluid further comprises the an additive selected from the group consisting of a salt; a weighting agent; an inert solid; an emulsifier; a dispersion aid; a corrosion inhibitor; an emulsion thinner; an emulsion thickener; a viscosifying agent; a gelling agent; a surfactant; a particulate; a proppant; a gravel particulate; a foaming agent; a gas; a pH control additive; a breaker; a biocide; a crosslinker; a stabilizer; a chelating agent; a scale inhibitor; a gas hydrate inhibitor; a mutual solvent; an oxidizer; a reducer; a friction reducer; a clay stabilizing agent; and any combination thereof.

* * * * *